United States Patent
Beiermann

(10) Patent No.: US 7,356,867 B1
(45) Date of Patent: Apr. 15, 2008

(54) ROTATABLE VEHICLE RIM CLEANING DEVICE

(76) Inventor: David M. Beiermann, 12511 Lorna St., Garden Grove, CA (US) 92841

( * ) Notice: Subject to any disclaimer, the term of this patent is extended or adjusted under 35 U.S.C. 154(b) by 551 days.

(21) Appl. No.: 10/914,999

(22) Filed: Aug. 11, 2004

(51) Int. Cl.
*A46B 13/02* (2006.01)
*B08B 9/023* (2006.01)

(52) U.S. Cl. .............................. 15/23; 15/88; 15/104.04
(58) Field of Classification Search ................. 15/22.1, 15/23, 28, 88, 104.04
See application file for complete search history.

(56) References Cited

U.S. PATENT DOCUMENTS

| | | | |
|---|---|---|---|
| 2,707,851 A | 5/1955 | Strong | |
| 3,106,732 A * | 10/1963 | Dayton et al. ................. | 15/28 |
| 3,343,192 A * | 9/1967 | Goldstein et al. .............. | 15/23 |
| 3,604,040 A | 9/1971 | Cohen | |
| 3,987,549 A * | 10/1976 | Robertelli ................... | 433/128 |
| 4,426,747 A | 1/1984 | Mola et al. | |
| 5,054,149 A * | 10/1991 | Si-Hoe et al. ................. | 15/28 |
| 5,177,827 A | 1/1993 | Ellison | |
| 5,235,716 A * | 8/1993 | Stella ............................. | 15/23 |
| 5,269,104 A * | 12/1993 | DiBiagio .................... | 451/344 |
| 5,307,534 A * | 5/1994 | Miller ............................. | 15/4 |
| D356,213 S | 3/1995 | Chaves | |
| 5,423,102 A * | 6/1995 | Madison ..................... | 15/22.2 |
| D370,348 S | 6/1996 | McElheney | |
| 5,809,601 A * | 9/1998 | Rivera ........................... | 15/23 |
| 5,822,821 A * | 10/1998 | Sham .......................... | 15/22.1 |
| 6,170,107 B1 | 1/2001 | George et al. | |
| 6,295,681 B1 | 10/2001 | Dolah | |
| 6,961,974 B1 * | 11/2005 | Goolsby, Jr. ............. | 15/104.04 |
| 2004/0074025 A1 * | 4/2004 | Blaustein et al. .............. | 15/23 |
| 2004/0128778 A1 * | 7/2004 | Wong .......................... | 15/22.1 |
| 2005/0086752 A1 * | 4/2005 | Lee ................................ | 15/23 |
| 2005/0150067 A1 * | 7/2005 | Cobabe et al. ............... | 15/22.1 |

* cited by examiner

*Primary Examiner*—Randall Chin

(57) ABSTRACT

A hand-operable brush for cleaning the crevices of vehicle rims includes a handle having adjacent internal compartments and proximal and distal ends. The handle has an outer surface with linear grooves for assisting an operator to maintain a sufficient grip. The distal end is provided with an outlet in fluid communication with the compartments. A variable speed motor is disposed within one of the compartments and includes a drive shaft and a switch connected thereto. The device also includes a cleaning section including a driven shaft operable via the motor and having bristles extending away therefrom. A coupling member is positioned adjacent to the distal end and provided with isolated channels for receiving the drive shaft and the driven shaft. A power supply source including a plurality of batteries is housed within one compartment and is electrically coupled to the motor.

15 Claims, 6 Drawing Sheets

ROTATABLE VEHICLE RIM CLEANING DEVICE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a cleaning device and, more particularly, to a portable vehicle rim cleaning device.

2. Prior Art

As is well-known in the art, many devices and tools exist for assisting in the cleaning of car rims, mag-wheels, and the like. Arising from the inherent problems and inadequacies associated with a common sponge or washcloth, these devices have been developed to solve a variety of particular problems associated with the cleaning of these objects that have complex and intricate shapes.

More specifically, cleaning devices such as brush cleaning devices for single specialized purposes are known in the art. However, in order to have the benefit of a multiplicity of these specialized cleaning devices, one must purchase each of these specialized devices at significant combined cost. Further, upon purchasing all of these specialized devices, significant storage area must be dedicated to storing all of the specialized devices. Still further, maintaining each of the devices and toting the devices around during cleaning chores poses further challenges to the use of these individual devices.

Accordingly, a need remains for a rotatable wheel rim cleaning device in order to overcome the above-noted shortcomings. The present invention satisfies such a need by providing a wheel rim cleaning device that is easy to use, results in time and effort savings, is small and compact in size, portable, and effectively cleans rims in an easy manner. Such a device eliminates the need to polish and clean a vehicle's wheel rims manually, while also retaining the option to attach alternate cleaning tools to the device.

BRIEF SUMMARY OF THE INVENTION

In view of the foregoing background, it is therefore an object of the present invention to provide a rotatable vehicle rim cleaning device. These and other objects, features, and advantages of the invention are provided by a hand-operable brush for cleaning the crevices of vehicle rims.

The brush includes a hollow handle section having a plurality of adjacent internal compartments and a substantially cylindrical shape. Such a handle section is provided with a centrally disposed longitudinal axis further having proximal and distal end portions oppositely spaced along the axis. The handle section includes a cap removably attachable to the proximal end portion for conveniently allowing a user to access one of the compartments thereof. Such a handle further has an outer surface provided with a plurality of linear grooves extending substantially parallel to the axis for advantageously assisting an operator to maintain a sufficient grip of the brush. The distal end portion is provided with an outlet in fluid communication with the compartments.

A variable speed motor is disposed within another of the compartments and includes an elongated drive shaft extending axially and distally therefrom. Such a motor further includes a switch operably connected thereto for allowing a user to selectively toggle the brush between operating and non-operating modes.

The device also includes a cleaning section including a driven shaft operable via the motor and extending distally away from the handle section. Such a cleaning section includes a plurality of bristles preferably having a plurality of cores annularly spaced about the axis and extending radially away from the driven shaft. The plurality of bristles are axially rotatable at alternate speeds and directions. The driven shaft preferably includes a plurality of first portions radially spaced therefrom and extending substantially orthogonal to the axis. Such a driven shaft further includes a plurality of resilient second portions spaced therefrom and integrally attached to the first portions respectively. The second portions extend substantially parallel to the driven shaft wherein the bristles are attached to the second portions respectively and are axially offset from the axis for advantageously adapting to a general shape of a vehicle rim fastening member.

In an alternate embodiment, the driven shaft may have a substantially smooth outer surface provided with a hollow distal end portion for defining a cavity. The bristles are randomly spaced along the outer surface wherein the bristles radially extend inwardly and outwardly from the outer surface so that the hollow distal end portion can be selectively positioned about a vehicle rim fastening member during operating conditions. Such bristles are preferably sized and shaped to be substantially linear.

The present invention further includes a coupling member axially positioned adjacent to the distal end portion. Such a coupling member is provided with a plurality of isolated channels sized and shaped for receiving the drive shaft and the driven shaft so that the cleaning section and the motor will contemporaneously rotate at the selected speed and direction. The drive shaft, the driven shaft, and the coupling channels all preferably have corresponding hexagonal cross-sections. A power supply source including a plurality of batteries is housed within one compartment and is electrically coupled to the motor.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
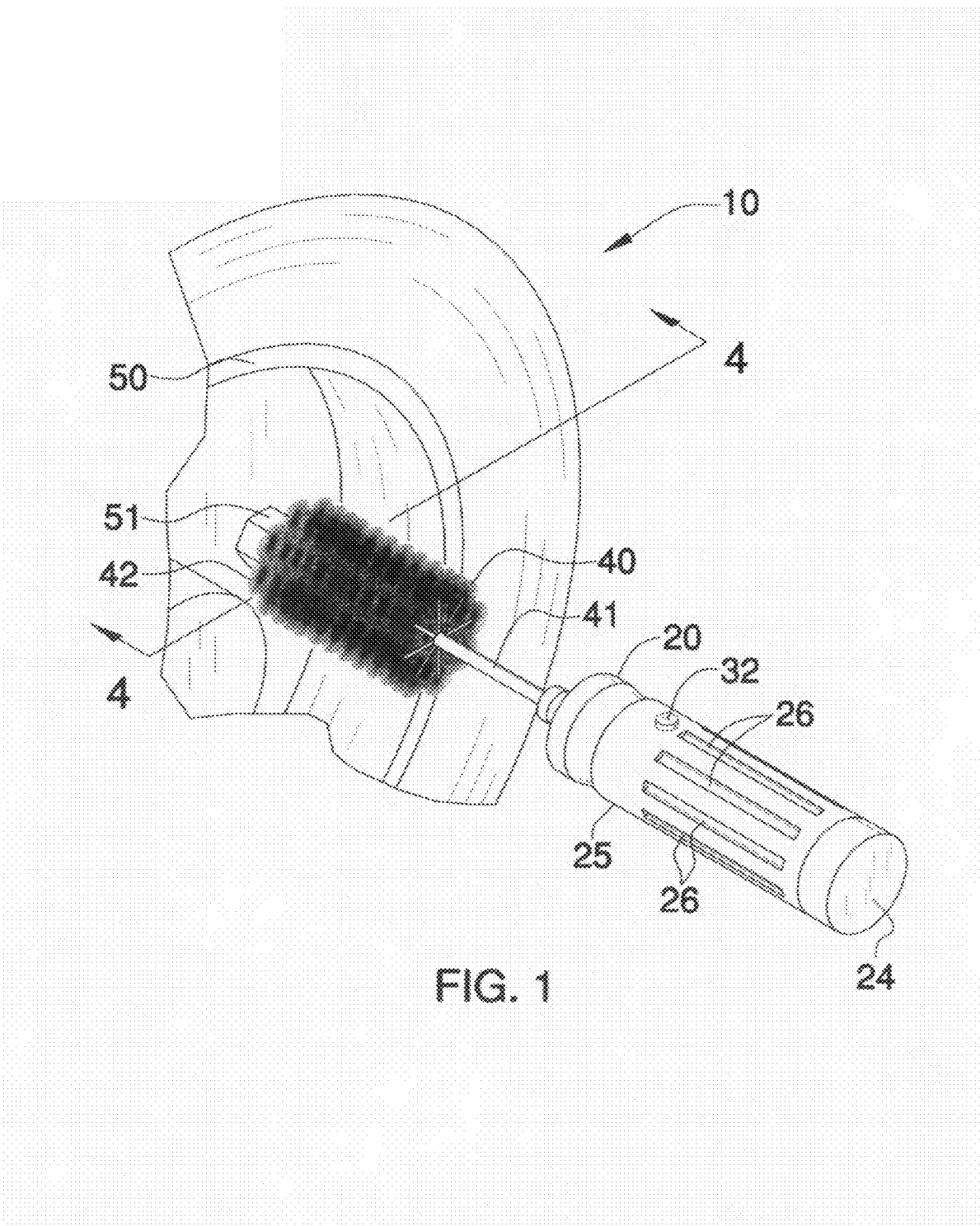
FIG. 1 is a perspective view showing a hand-operable brush for cleaning vehicle rims' crevices, in accordance with the present invention.
Figure 2:
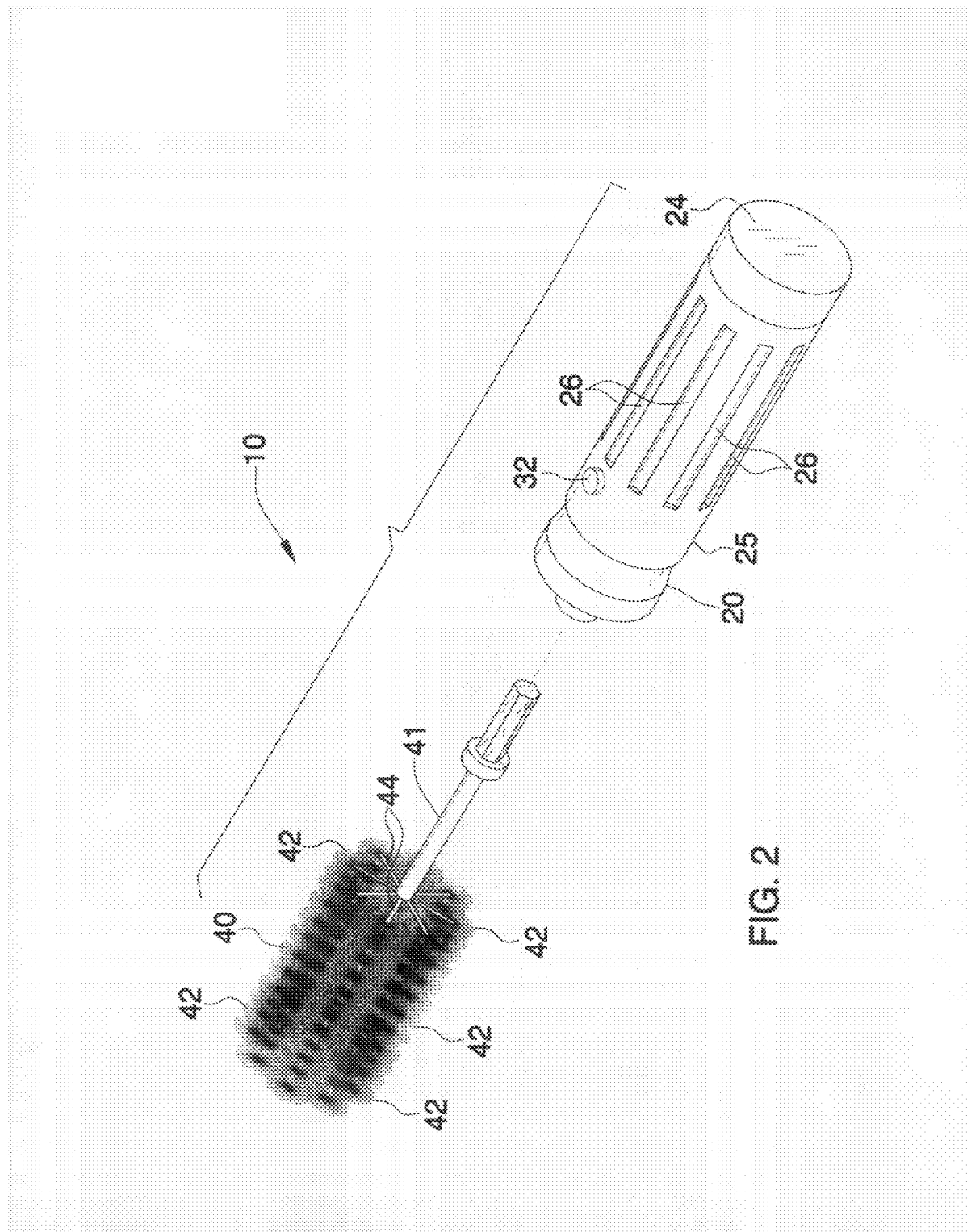
FIG. 2 is a partially exploded perspective view of the device shown in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime and double prime numbers refer to alternate embodiments of such elements.

The device of this invention is referred to generally in FIGS. 1-8 by the reference numeral 10 and is intended to provide a rotatable vehicle rim cleaning device. It should be understood that the device 10 may be used/adapted to clean many different types of surfaces and should not be limited to only vehicle rims.

Referring initially to FIG. 1, the device 10 includes a hollow handle section 20 having a plurality of adjacent internal compartments 21 and a substantially cylindrical shape. Such a handle section 20 is provided with a centrally disposed longitudinal axis further having proximal 22 and distal 23 end portions oppositely spaced along the axis. The handle section 20 includes a cap 24 removably attachable to the proximal end portion 22 for conveniently allowing a user to access one of the compartments 21a thereof. The cap 24 advantageously allows for easy and convenient replacement of the batteries 71 (described herein below) as may be needed. Such a handle 20 further has an outer surface 25 provided with a plurality of linear grooves 26 extending substantially parallel to the axis for advantageously assisting an operator to maintain a sufficient grip of the brush 10. The distal end portion 23 is provided with an outlet 27 in fluid communication with the compartments 21.

Figure 3:
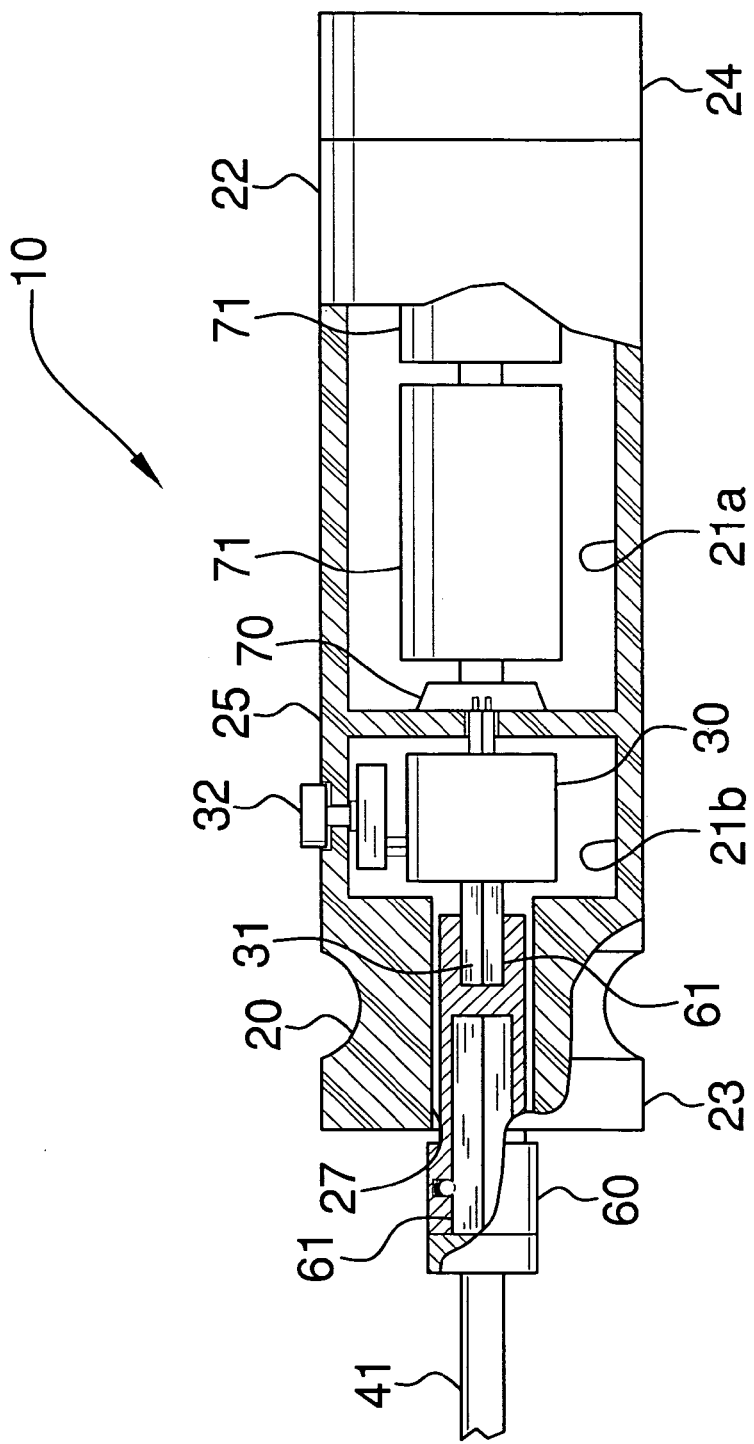
FIG. 3 is a partial cross-sectional view of the device shown in FIG. 1.

As can be seen in FIG. 3, a variable speed motor 30 is disposed within another of the compartments 21b and includes an elongated drive shaft 31 extending axially and distally therefrom. Such a motor 30 further includes a switch 32 operably connected thereto for allowing a user to selectively toggle the brush 10 between operating and non-operating modes.

Figure 4:
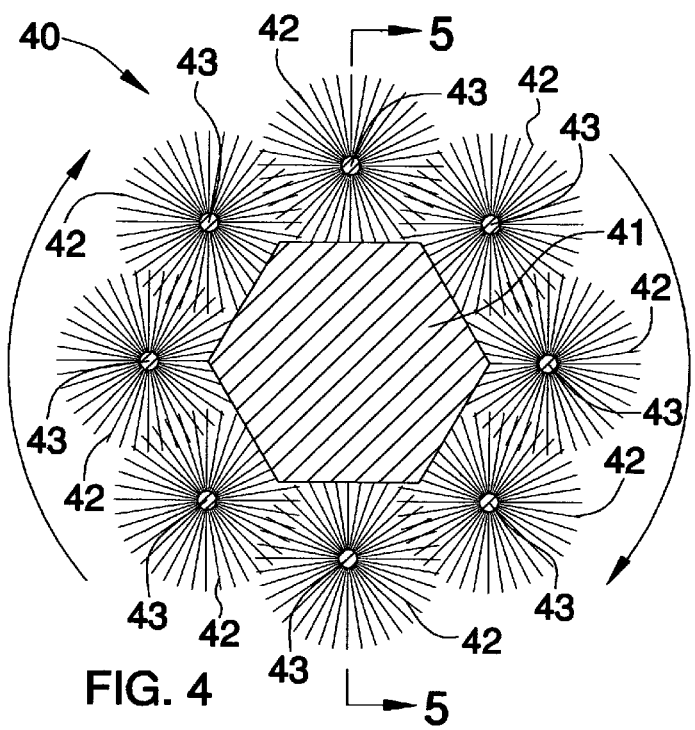
FIG. 4 is a cross-sectional view of the device shown in FIG. 1, taken along line 4-4.
Figure 5:
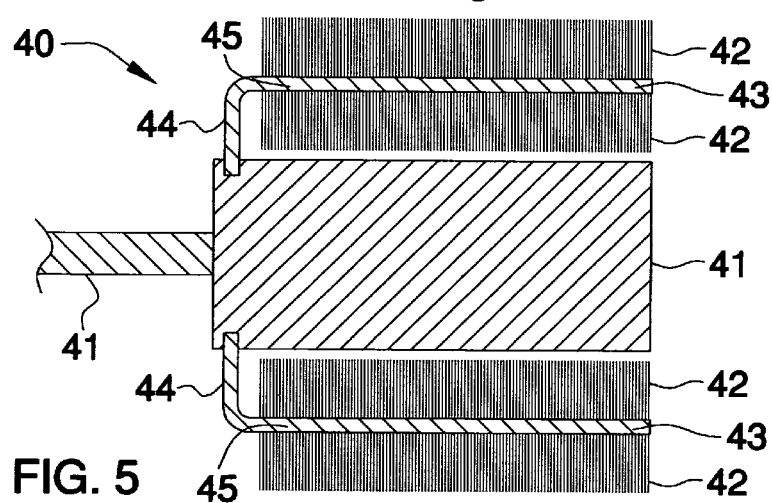
FIG. 5 is an enlarged cross-sectional view of the device shown in FIG. 4, taken along line 5-5.

The device 10 also includes a cleaning section 40, shown in FIGS. 4 and 5, including a driven shaft 41 operable via the motor 30 and extending distally away from the handle section 20. Such a cleaning section 40 includes a plurality of bristles 42 having a plurality of cores 43 annularly spaced about the axis, said bristles 42 extending radially away from the driven shaft 41. The plurality of bristles 42 are axially rotatable at alternate speeds and directions, conveniently allowing a user to adjust the speed and direction of the bristle 42 to correspond to the level of cleaning required. The driven shaft 41 includes a plurality of first portions 44 radially spaced therefrom and extending substantially orthogonal to the axis. Such a driven shaft 41 further includes a plurality of resilient second portions 45 spaced therefrom and integrally attached to the first portions 44 respectively.

Figure 6:
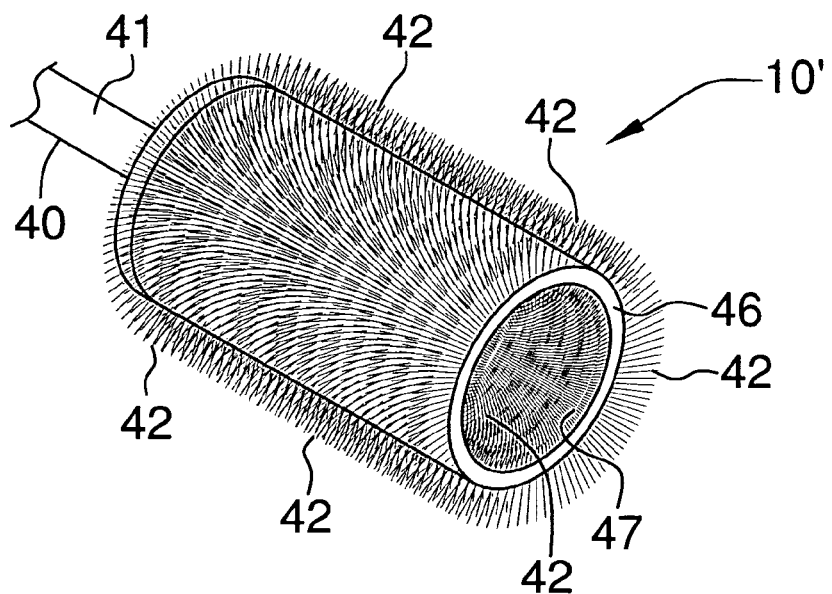
FIG. 6 is a perspective view showing an alternate driven shaft.
Figure 7:
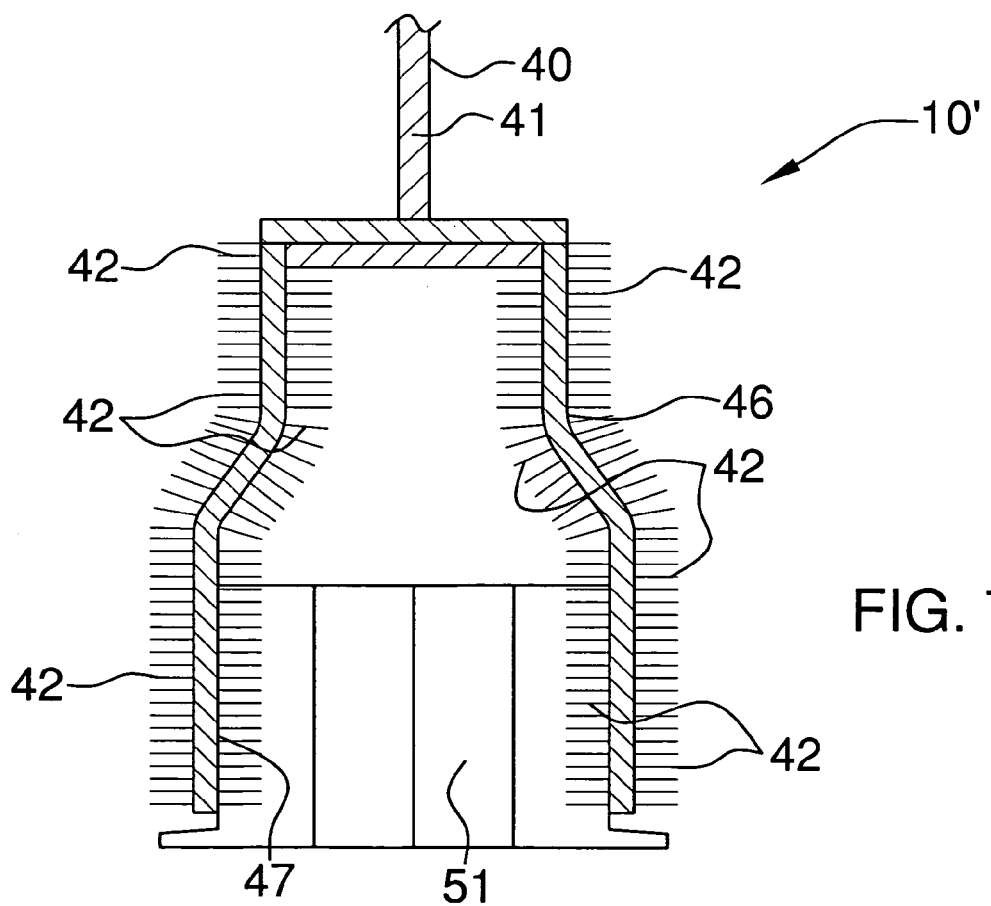
FIG. 7 is a cross-sectional view of the driven shaft shown in FIG. 6, engaged about a vehicle rim fastening member.

In an alternate embodiment 10', illustrated in FIGS. 6 and 7, the driven shaft 41 has a substantially smooth outer surface 46 provided with a hollow distal end portion 47 for defining a cavity. The bristles 42 are randomly spaced along the outer surface 46 wherein the bristles 42 radially extend inwardly and outwardly from the outer surface 46 so that the hollow distal end portion 47 can be selectively positioned about a vehicle rim 50 fastening member 51 during operating conditions. This embodiment 10' also allows for mechanical cleaning of the members 51 that usually require manual cleaning. Such bristles 42 are sized and shaped to be substantially linear.

Figure 8:
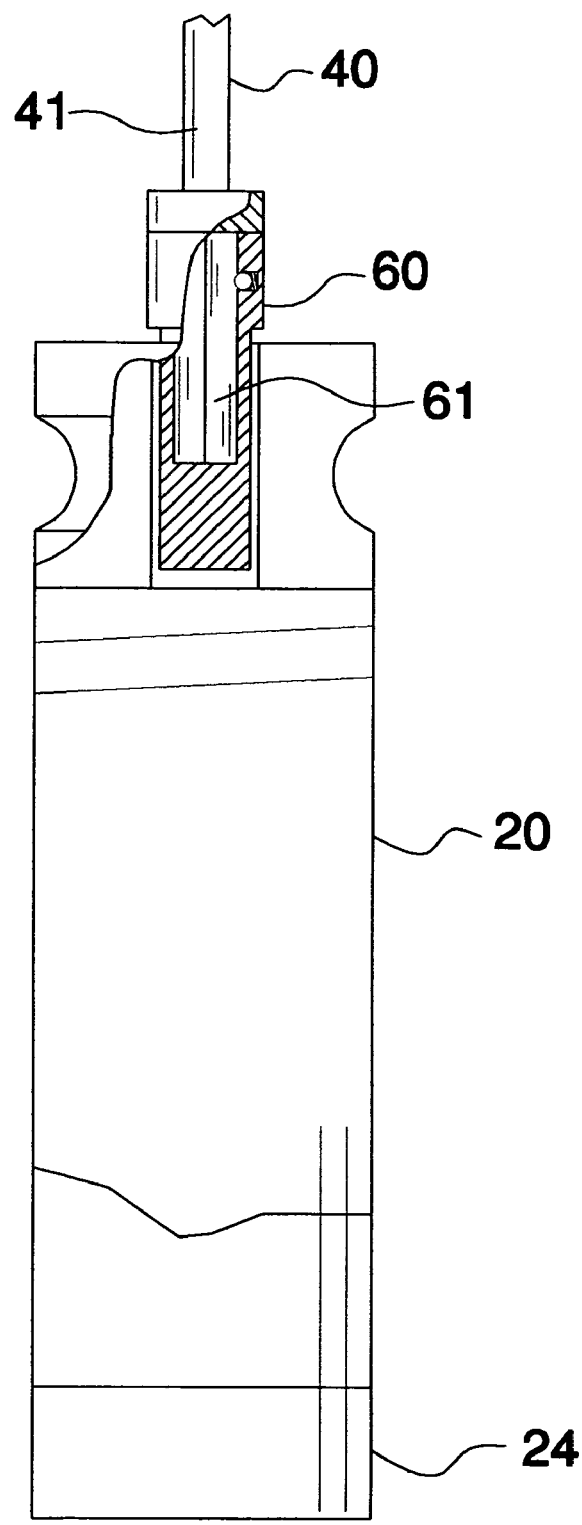
FIG. 8 is a partial cross-sectional view of the device shown in FIG. 1.

As can be seen in FIGS. 3 and 8, the present invention further includes a coupling member 60 axially positioned adjacent to the distal end portion 23. Such a coupling member 60 is provided with a plurality of isolated channels 61 sized and shaped for receiving the drive shaft 31 and the driven shaft 41 so that the cleaning section 40 and the motor 30 will contemporaneously rotate at the selected speed and direction. The drive shaft 31, the driven shaft 41, and the coupling channels 61 all have corresponding hexagonal cross-sections. As shown in FIG. 3, a power supply source 70 including a plurality of batteries 71 is housed within one compartment 21a and is electrically coupled to the motor 30. Such a power supply source 70 advantageously allows the brush 10 to be operated mechanically, eliminating the need for manual cleaning of vehicle rims 50 and their corresponding fastening members 51.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A hand-operable brush for cleaning a vehicle rim's crevices, said brush comprising:

a hollow handle section having a plurality of internal compartments and a substantially cylindrical shape, said handle section being provided with a centrally disposed longitudinal axis and further having proximal and distal end portions oppositely spaced along the axis, said handle section comprising a cap removably attachable to said proximal end portion and for allowing a user to access one said compartments thereof;

a variable speed motor disposed within another said compartments and comprising an elongated drive shaft extending axially and distally therefrom, said motor further comprising a switch operably connected thereto for allowing a user to selectively toggle said brush between operating and non-operating modes;

a cleaning section comprising a driven shaft operable via said motor and extending distally away from said handle section, said cleaning section comprising a plurality of bristles extending radially away from said driven shaft and being axially rotatable at alternate speeds and directions;

a coupling member axially positioned adjacent said distal end portion and being provided with a plurality of isolated channels sized and shaped for receiving said drive shaft and said driven shaft so that said cleaning section and said motor will contemporaneously rotate at the selected speed and direction; and a power supply source housed within said one compartment and being electrically coupled to said motor;

wherein said driven shaft comprising:

a plurality of first portions radially spaced therefrom and extending substantially orthogonal to the axis, said driven shaft further including a plurality of resilient second portions spaced therefrom and integrally attached to said first portions respectively, said second portions extending substantially parallel to said driven shaft wherein said bristles are attached to said second portions respectively and are axially offset from the axis for adapting to a general shape of a vehicle rim fastening member.

2. The brush of claim 1, wherein said bristles have a plurality of cores annularly spaced about the axis.

3. The brush of claim 1, wherein said driven shaft has a substantially smooth outer surface provided with a hollow distal end portion for defining a cavity, said bristles being randomly spaced along said outer surface wherein said bristles radially extend inwardly and outwardly from said outer surface so that said hollow distal end portion can be selectively positioned about a vehicle rim fastening member during operating conditions.

4. The brush of claim 1, wherein said bristles are sized and shaped to be substantially linear.

5. The brush of claim 1, wherein said drive shaft and said driven shaft and said coupling channels have corresponding hexagonal cross-sections.

6. A hand-operable brush for cleaning a vehicle rim's crevices, said brush comprising:

a hollow handle section having a plurality of internal compartments and a substantially cylindrical shape, said handle section being provided with a centrally disposed longitudinal axis and further having proximal and distal end portions oppositely spaced along the axis, said handle section comprising a cap removably attachable to said proximal end portion and for allowing a user to access one said compartments thereof, said handle having an outer surface provided with a plurality of linear grooves extending substantially parallel to the axis and for assisting an operator to maintain a sufficient grip of said brush;

a variable speed motor disposed within another said compartments and comprising an elongated drive shaft extending axially and distally therefrom, said motor further comprising a switch operably connected thereto for allowing a user to selectively toggle said brush between operating and non-operating modes;

a cleaning section comprising a driven shaft operable via said motor and extending distally away from said handle section, said cleaning section comprising a plurality of bristles extending radially away from said driven shaft and being axially rotatable at alternate speeds and directions;

a coupling member axially positioned adjacent said distal end portion and being provided with a plurality of isolated channels sized and shaped for receiving said drive shaft and said driven shaft so that said cleaning section and said motor will contemporaneously rotate at the selected speed and direction; and a power supply source housed within said one compartment and being electrically coupled to said motor;

wherein said driven shaft comprising:

a plurality of first portions radially spaced therefrom and extending substantially orthogonal to the axis, said driven shaft further including a plurality of resilient second portions spaced therefrom and integrally attached to said first portions respectively, said second portions extending substantially parallel to said driven shaft wherein said bristles are attached to said second portions respectively and are axially offset from the axis for adapting to a general shape of a vehicle rim fastening member.

7. The brush of claim 6, wherein said bristles have a plurality of cores annularly spaced about the axis.

8. The brush of claim 6, wherein said driven shaft has a substantially smooth outer surface provided with a hollow distal end portion for defining a cavity, said bristles being randomly spaced along said outer surface wherein said bristles radially extend inwardly and outwardly from said outer surface so that said hollow distal end portion can be selectively positioned about a vehicle rim fastening member during operating conditions.

9. The brush of claim 6, wherein said bristles are sized and shaped to be substantially linear.

10. The brush of claim 6, wherein said drive shaft and said driven shaft and said coupling channels have corresponding hexagonal cross-sections.

11. A hand-operable brush for cleaning a vehicle rim's crevices, said brush comprising:

a hollow handle section having a plurality of adjacent internal compartments and a substantially cylindrical shape, said handle section being provided with a centrally disposed longitudinal axis and further having proximal and distal end portions oppositely spaced along the axis, said handle section comprising a cap removably attachable to said proximal end portion and for allowing a user to access one said compartments thereof, said handle having an outer surface provided with a plurality of linear grooves extending substantially parallel to the axis and for assisting an operator to maintain a sufficient grip of said brush, said distal end portion being provided with an outlet in fluid communication with said compartments;

a variable speed motor disposed within another said compartments and comprising an elongated drive shaft extending axially and distally therefrom, said motor further comprising a switch operably connected thereto for allowing a user to selectively toggle said brush between operating and non-operating modes;

a cleaning section comprising a driven shaft operable via said motor and extending distally away from said handle section, said cleaning section comprising a plurality of bristles extending radially away from said driven shaft and being axially rotatable at alternate speeds and directions;

a coupling member axially positioned adjacent said distal end portion and being provided with a plurality of isolated channels sized and shaped for receiving said drive shaft and said driven shaft so that said cleaning section and said motor will contemporaneously rotate at the selected speed and direction; and a power supply source comprising a plurality of batteries housed within said one compartment and being electrically coupled to said motor;

wherein said driven shaft comprising:

a plurality of first portions radially spaced therefrom and extending substantially orthogonal to the axis, said driven shaft further including a plurality of resilient second portions spaced therefrom and integrally attached to said first portions respectively, said second portions extending substantially parallel to said driven shaft wherein said bristles are attached to said second portions respectively and are axially offset from the axis for adapting to a general shape of a vehicle rim fastening member.

12. The brush of claim 11, wherein said bristles have a plurality of cores annularly spaced about the axis.

13. The brush of claim 11, wherein said driven shaft has a substantially smooth outer surface provided with a hollow distal end portion for defining a cavity, said bristles being randomly spaced along said outer surface wherein said bristles radially extend inwardly and outwardly from said outer surface so that said hollow distal end portion can be selectively positioned about a vehicle rim fastening member during operating conditions.

14. The brush of claim 11, wherein said bristles are sized and shaped to be substantially linear.

15. The brush of claim 11, wherein said drive shaft and said driven shaft and said coupling channels have corresponding hexagonal cross-sections.

* * * * *